US012563033B2

(12) United States Patent
Ketharaju et al.

(10) Patent No.: US 12,563,033 B2
(45) Date of Patent: Feb. 24, 2026

(54) SYSTEMS AND METHODS FOR SIMULTANEOUS MACHINE MULTIFACTOR AUTHENTICATION

(71) Applicant: Wells Fargo Bank, N.A., San Francisco, CA (US)

(72) Inventors: Rameshchandra Bhaskar Ketharaju, Hyderabad (IN); Justin Blackburn, Litchfield Park, AZ (US); Debashis Ghosh, Charlotte, NC (US); Ashutosh Verma, Bengaluru (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 159 days.

(21) Appl. No.: 18/468,415

(22) Filed: Sep. 15, 2023

(65) Prior Publication Data

US 2025/0097214 A1 Mar. 20, 2025

(51) Int. Cl.
*H04L 9/40* (2022.01)
(52) U.S. Cl.
CPC .......... *H04L 63/083* (2013.01); *H04L 63/123* (2013.01)
(58) Field of Classification Search
CPC ........................... H04L 63/083; H04L 63/123; H04L 2463/082
See application file for complete search history.

(56) References Cited

U.S. PATENT DOCUMENTS

| | | | |
|---|---|---|---|
| 1,074,267 A | 9/1913 | Kay | |
| 8,590,024 B2 | 11/2013 | Sims | |

| | | | | |
|---|---|---|---|---|
| 8,990,912 B2 | 3/2015 | Baentsch | |
| 11,102,180 B2 | 8/2021 | Dino | |
| 11,336,644 B2 | 5/2022 | Uzun | |
| 2014/0082720 A1 | 3/2014 | Markel | |
| 2014/0281506 A1* | 9/2014 | Redberg | H04L 63/0442 713/159 |
| 2015/0006115 A1* | 1/2015 | Svoboda | G01D 3/08 702/190 |
| 2015/0254443 A1* | 9/2015 | Blessing | G06F 21/32 726/7 |
| 2016/0087957 A1* | 3/2016 | Shah | H04L 63/205 726/1 |
| 2016/0127898 A1* | 5/2016 | Gupta | G06F 21/43 726/7 |

(Continued)

FOREIGN PATENT DOCUMENTS

| | | |
|---|---|---|
| CN | 112182550 A | 1/2021 |
| EP | 3286945 A1 | 2/2018 |

*Primary Examiner* — Catherine Thiaw
*Assistant Examiner* — Nega Woldemariam
(74) *Attorney, Agent, or Firm* — K&L Gates LLP

(57) ABSTRACT

Systems, apparatuses, methods, and computer program products are disclosed for simultaneous machine multifactor authentication. An example method includes simultaneously receiving, by communications hardware and in response to a machine authentication request, a plurality of authentication factors for a machine via a plurality of channels, wherein the plurality of authentication factors comprises at least one hardware-based challenge authentication factor. The example method further includes verifying, by an authentication engine, the plurality of authentication factors in parallel and authorizing, by the authentication engine, one or more actions based on a successful verification of the plurality of authentication factors.

20 Claims, 5 Drawing Sheets

(56)　　　　　　References Cited

U.S. PATENT DOCUMENTS

| | | | |
|---|---|---|---|
| 2016/0248752 A1* | 8/2016 | Blinn | H04L 63/083 |
| 2018/0198614 A1* | 7/2018 | Neumann | H04W 12/126 |
| 2019/0379542 A1* | 12/2019 | Michael | G06F 13/4282 |
| 2020/0045542 A1* | 2/2020 | Wilson | H04W 12/069 |
| 2020/0344599 A1* | 10/2020 | Duo | H04W 80/10 |
| 2022/0254206 A1* | 8/2022 | Dykstra | G07C 9/27 |
| 2023/0139491 A1* | 5/2023 | Paul | H04L 63/08 |
| | | | 726/1 |
| 2023/0171253 A1* | 6/2023 | Liu | G06F 9/541 |
| | | | 726/7 |
| 2023/0261742 A1* | 8/2023 | Yang | H04W 12/06 |
| | | | 455/410 |
| 2023/0344828 A1* | 10/2023 | Sloane | H04L 63/0861 |

* cited by examiner

Simultaneously receive a plurality of authentication factors for a machine via a plurality of channels
302

Verify the plurality of authentication factors in parallel
304

Authorize one or more actions based on a successful verification of the plurality of authentication factors
306

SYSTEMS AND METHODS FOR SIMULTANEOUS MACHINE MULTIFACTOR AUTHENTICATION

BACKGROUND

Multifactor authentication requires verifying more than one distinct authentication factor for successful authentication of a user. However, implementations of multifactor authentication with respect to authenticating machines exhibit various issues and shortcomings.

BRIEF SUMMARY

Machine authentication is a useful tool for verifying the identity and integrity of machines (e.g., autonomous machines) prior to granting them access to perform tasks or providing them with sensitive information. Machine authentication may prevent bad actors from attempting to gain unauthorized access to a machine and further prevent a compromised machine from accessing critical infrastructure, sensitive data, and/or the like. Machine authentication contrasts with user authentication, which is reliant upon the presence of a human user. However, factors used in common machine authentication techniques like single-factor machine authentication (e.g., verifying a machines serial number, media access control (MAC) address, internet protocol (IP) address, a digital certificate or token, and/or the like) may be easily obtained (and with nefarious intent). For example, a bad actor may clone a machine thereby replicating various machine authentication factors, such as a serial numbers, addresses, and/or the like.

In some examples, unique profiles for a particular machine may be generated and used for machine authentication based on challenging a particular component of a machine. For example, a system may instruct a machine to challenge a hardware component by providing a small voltage to the battery and assessing the response (e.g., an impedance measurement). The response may be included in the unique profile of a particular machine and subsequently used for authentication of the particular machine. However, despite the increased complexity of challenging hardware-based authentication factors, these single factor authentication techniques continue to be highly vulnerable to bad actors.

Multifactor authentication utilizes two or more authentication factors. For example, a server may require two or more of the single-factor authentication techniques described above in order to authenticate a user. While multifactor authentication adds an additional requirement of multiple authentication factors, current implementations of multifactor authentication are typically directed to authenticating users and not autonomous machines. Further, these current implementations of multifactor authentication operate to sequentially verify the different authentication factors, leading to prolonged authentication times which in turn introduce an increased potential for fraud (e.g., a bad actor may obtain the multiple authentication factors in the time available between factor authentication).

Example embodiments alleviate the issues discussed above by simultaneously receiving and verifying multiple authentication factors of a (e.g., autonomous) machine in parallel, including one or more hardware-based challenge authentication factors. To do so, some example embodiments may leverage capabilities of advanced cellular networks (e.g., sixth generation (6G) cellular networks), as further discussed herein. Example embodiments may simultaneously receive, in response to a machine authentication request, a plurality of authentication factors for a machine via a plurality of channels. In some embodiments, the plurality of authentication factors for a machine may correspond to different authentication factor categories (e.g., hardware-based challenge factors, possession factors, inherence factors, location factors, or behavior factors). Alternatively, in some embodiments, the received plurality of authentication factors may be the same factor of authentication transmitted from multiple computing devices.

Example embodiments may also verify the plurality of authentication factors for a machine in parallel. A security scoring model may be applied to the plurality of authentication factors that produces a security score indicative of the authenticity of the plurality of authentication factors. In some embodiments, the security scoring model may be applied to each authentication factor included in the plurality of authentication factors in parallel to produce a per-authentication factor security score. In other words, a security score may be determined for each authentication factor. In some embodiments, the per-authentication factor security scores (for each authentication factor) may be weighted and summed to determine a security score associated with the plurality of authentication factors. Additionally, in some embodiments, another computing device may be leveraged to obtain authentication factors about a particular machine. In some embodiments, one or more machines may be included in a fleet of machines and the fleet of machines may be connected or otherwise associated with each other, such as via a blockchain network. In some embodiments, various machines in the fleet of machines may identify (e.g., via the blockchain network) any hardware or software modifications associated with any machine in the fleet of machines.

Example embodiments may also authorize one or more actions based on a successful verification of at least a subset of the plurality of authentication factors. In some embodiments, the one or more actions may be authorized based on a comparison of the computed security score and a security score threshold that indicates a security score necessary to authorize a particular action. In addition, example embodiments may identify an exogenous context, such as a natural disaster, weather emergency, a recent power outage, or the like that impacts the availability of certain authentication factors about a machine. Example embodiments may then modify the requirements necessary for authorization based on the identified exogenous context.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements. The term "computing device," also referred to herein as "machine, refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smart-watches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
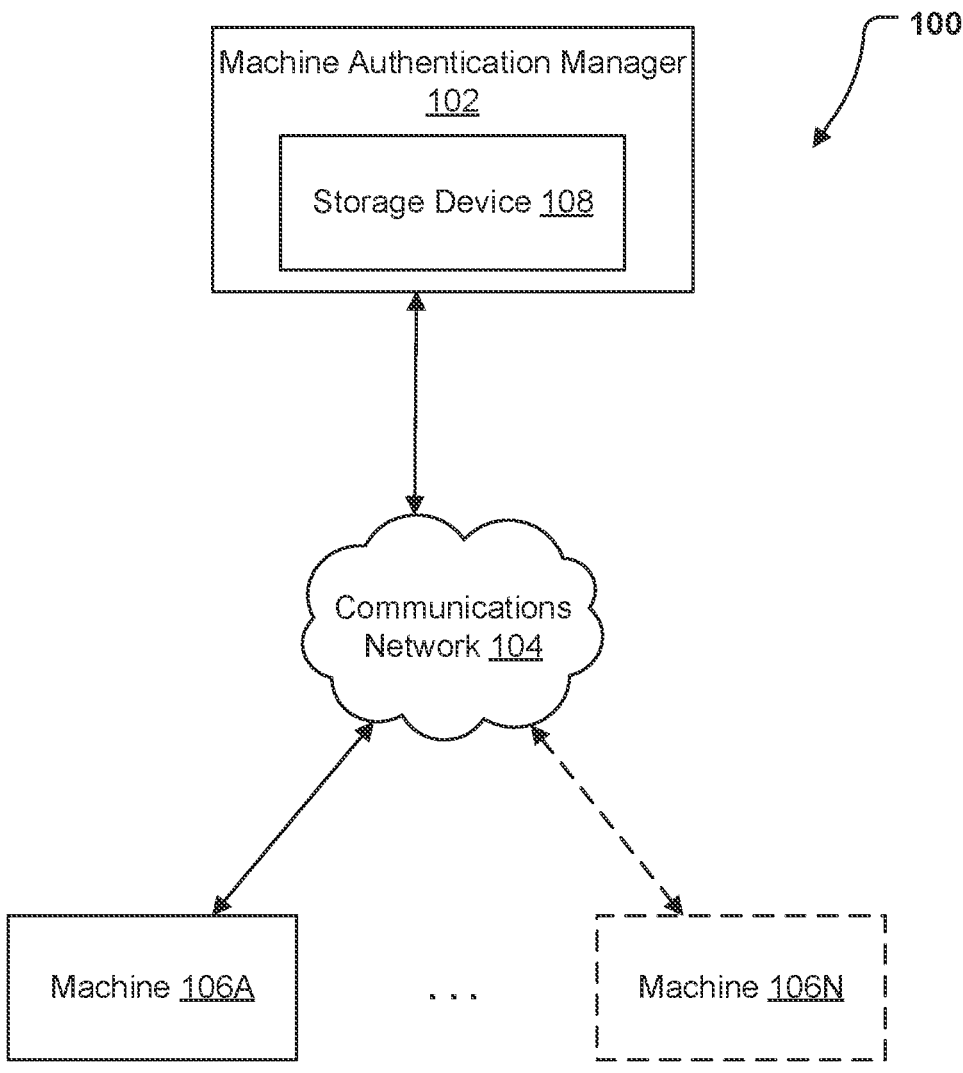
FIG. 1 illustrates a system in which some example embodiments may be used.

Example embodiments described herein may be implemented using any of a variety of computing devices or servers. To this end, FIG. 1 illustrates an example environment 100 within which various embodiments may operate. As illustrated, a machine authentication manager 102 may receive and/or transmit information via communications network 104 (e.g., a 5G advanced or 6G cellular network) with any number of other devices, such as one or more of machines 106A-106N.

In some embodiments, communications network 104 may be a 6G (sixth generation) cellular network. The 6G cellular network utilizes signals at the high end of the radio spectrum that may offer a data rate of 1 terabyte per second. The higher frequencies leveraged by the 6G cellular network may enable a higher capacity and reduced latency. In some embodiments, the reduced latencies permit simultaneous reception of data via a plurality of channels.

In addition, one or more computing devices (e.g., machine 106A through machine 106N) may use communications network 104 (e.g., a 6G cellular network) and leverage the benefits of a 6G network to simultaneously send data to the machine authentication manager 102. In some embodiments, each channel included in the plurality of channels may be dedicated to a particular authentication factor category. For example, possession factors may be transmitted via channel A, inherence factors via channel B, location factors via channel C, behavior factors via channel D, and hardware-based challenge factors may be transmitted via channel E, and/or the like.

The machine authentication manager 102 may be implemented as one or more computing devices or servers, which may be composed of a series of components. Particular components of the machine authentication manager 102 are described in greater detail below with reference to apparatus 200 in connection with FIG. 2.

In some embodiments, the machine authentication manager 102 further includes a storage device 108 that comprises a distinct component from other components of the machine authentication manager 102. Storage device 108 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 108 may host the software executed to operate the machine authentication manager 102. Storage device 108 may store information relied upon during operation of the machine authentication manager system 102, such as various algorithms that may be used by the machine authentication manager 102, data and documents to be analyzed using the machine authentication manager 102, or the like. In addition, storage device 108 may store control signals, device characteristics, and access credentials enabling interaction between the machine authentication manager 102 and one or more of the machines 106A-106N.

The one or more machines 106A-106N may be embodied by any computing devices known in the art, such as desktop or laptop computers, smartphones, smart devices, payment kiosks, Automated Teller Machines (ATMs), and/or the like. In addition, the one or more machines may include internet of things devices (IoT). For the one or more machines 106A-106N may include connected appliances, cameras, doorbells, televisions, and/or the like. In various embodiments, the one or more machines may include autonomous machines (e.g., a machine that acts without recourse to human control), such as, for example, autonomous vehicles, autonomous robots, autonomous equipment, cleaning robots, autonomous drones, and/or the like. The one or more machines 106A-106N need not themselves be independent devices, but may be peripheral devices communicatively coupled to other computing devices.

Although FIG. 1 illustrates an environment and implementation in which the machine authentication manager 102 interacts indirectly with one or more of machines 106A-106N, in some embodiments a user and/or machine (e.g., an autonomous machine) may directly interact with the machine authentication manager 102 (e.g., via communications hardware of the machine authentication manager 102). Whether by way of direct interaction or indirect interaction via another device, a user may communicate with, operate, control, modify, or otherwise interact with the machine authentication manger 102 to perform the various functions and achieve the various benefits described herein.

Example Implementing Apparatuses

The machine authentication manager 102 (described previously with reference to FIG. 1) may be embodied by one

5

Figure 2:
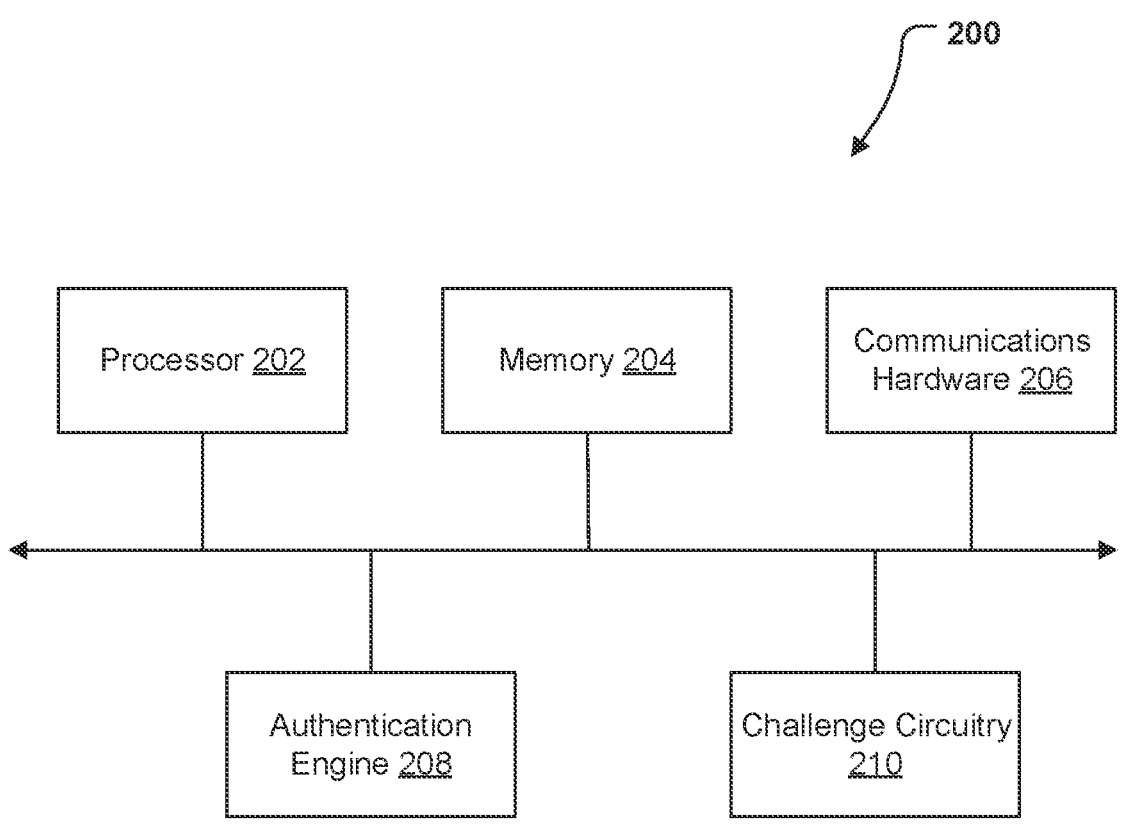
FIG. 2 illustrates a schematic block diagram of example circuitry embodying a system device that may perform various operations in accordance with some example embodiments described herein.

6 or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, authentication engine 208, and challenge circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, and multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and/or an autonomous machine and, in some embodiments, to receive an indication of input (e.g., user input or machine input). In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an authentication engine 208 that verifies the plurality of authentication factors in parallel. In particular, the authentication engine 208 may leverage a model, such as a security scoring model, by applying, in parallel, the security scoring model to each of the plurality of signature authentication factors and the plurality of authentication factors to ultimately generate a security score that may be used to verify the plurality of authentication factors. The authentication engine 208 may further authorize one or more actions based on a successful verification of the plurality of authentication factors. The authentication engine 208 may utilize processor 202, memory 204, or any other hardware component included in the apparatus 200 to perform these operations, as described in connection with FIGS. 3-5 below. The authentication engine 208 may further utilize communications hardware 206 to gather data from a variety of sources (e.g., machine 106A through machine 106N or storage device 108, as shown in FIG. 1), and/or exchange data with a user, and in some embodiments may utilize processor 202 and/or memory 204 to perform any or more of the above operations.

In addition, the apparatus 200 further comprises challenge circuitry 210 that identifies a hardware component associated with the hardware-based challenge authentication factor. In addition, challenge circuitry 210 may determine a hardware performance projection and determine a security score associated with the challenged authentication factor. The challenge circuitry 210 may utilize processor 202, memory 204, or any other hardware component included in the apparatus 200 to perform these operations, as described in connection with FIG. 5 below. The challenge circuitry 210 may further utilize communications hardware 206 to gather data from a variety of sources (e.g., machine 106A through machine 106N or storage device 108, as shown in FIG. 1), and/or exchange data with a user, and in some embodiments may utilize processor 202 and/or memory 204 to perform any or more of the above operations.

Although components 202-210 are described in part using functional language, it will be understood that the particular implementations necessarily include the use of particular hardware. It should also be understood that certain of these components 202-210 may include similar or common hardware. For example, the authentication engine 208 and challenge circuitry 210 may at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although authentication engine 208 and challenge circuitry 210 may leverage processor 202, memory 204, or communications hardware 206 as described above, it will be understood that authentication engine 208 and challenge circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that authentication engine 208 and challenge circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Figures 3, 4:
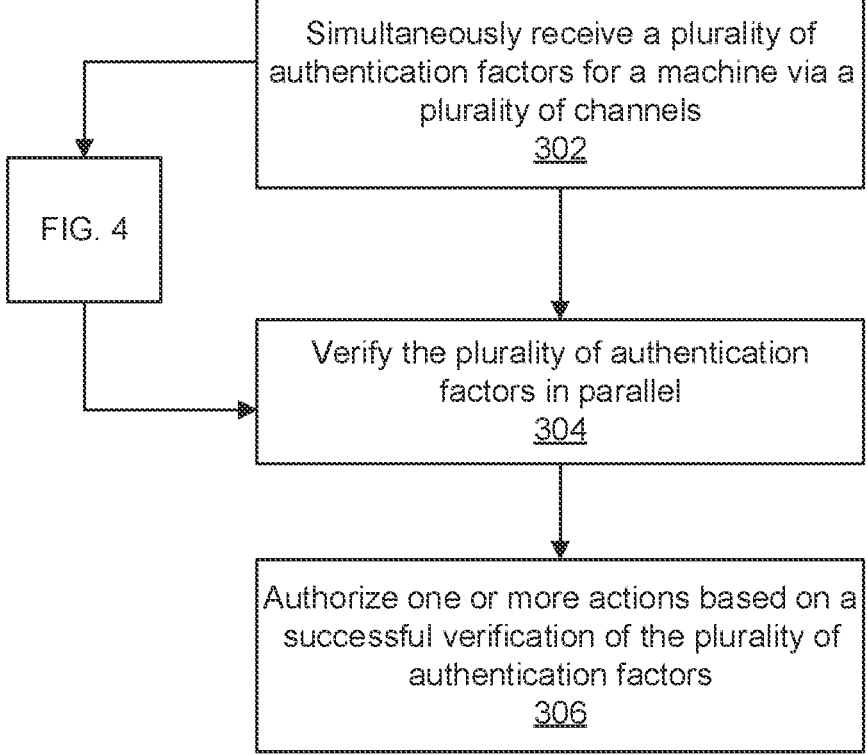
FIG. 3 illustrates an example flowchart for simultaneous machine multifactor authentication, in accordance with some example embodiments described herein.
FIG. 4 illustrates an example flowchart for causing performance of hardware-based challenge requests associated with a machine, in accordance with some example embodiments described herein.
Figure 4:
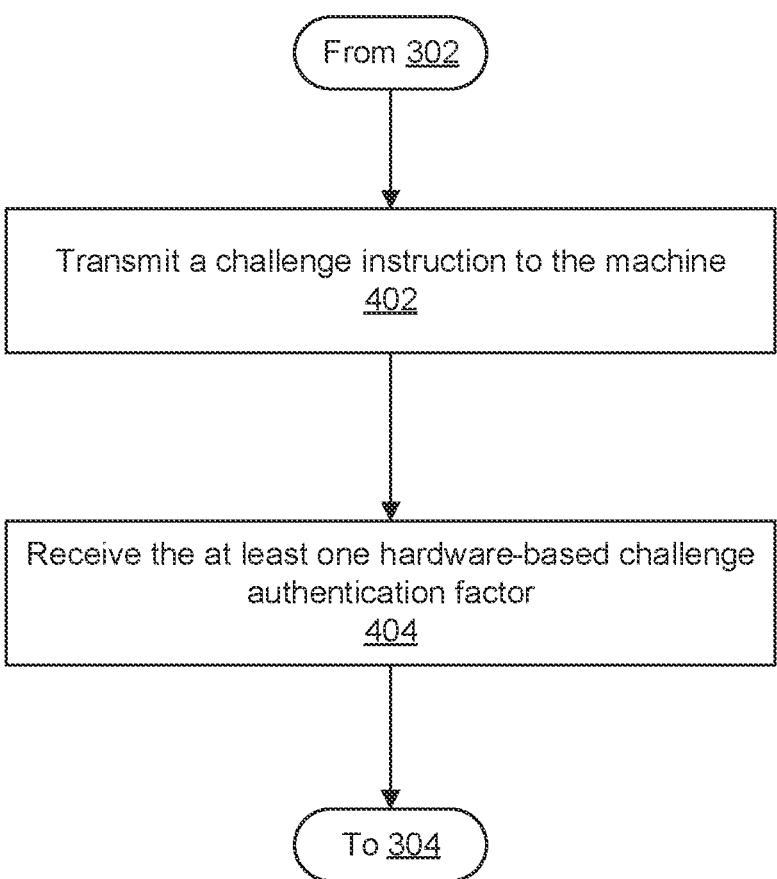
Figure 5:
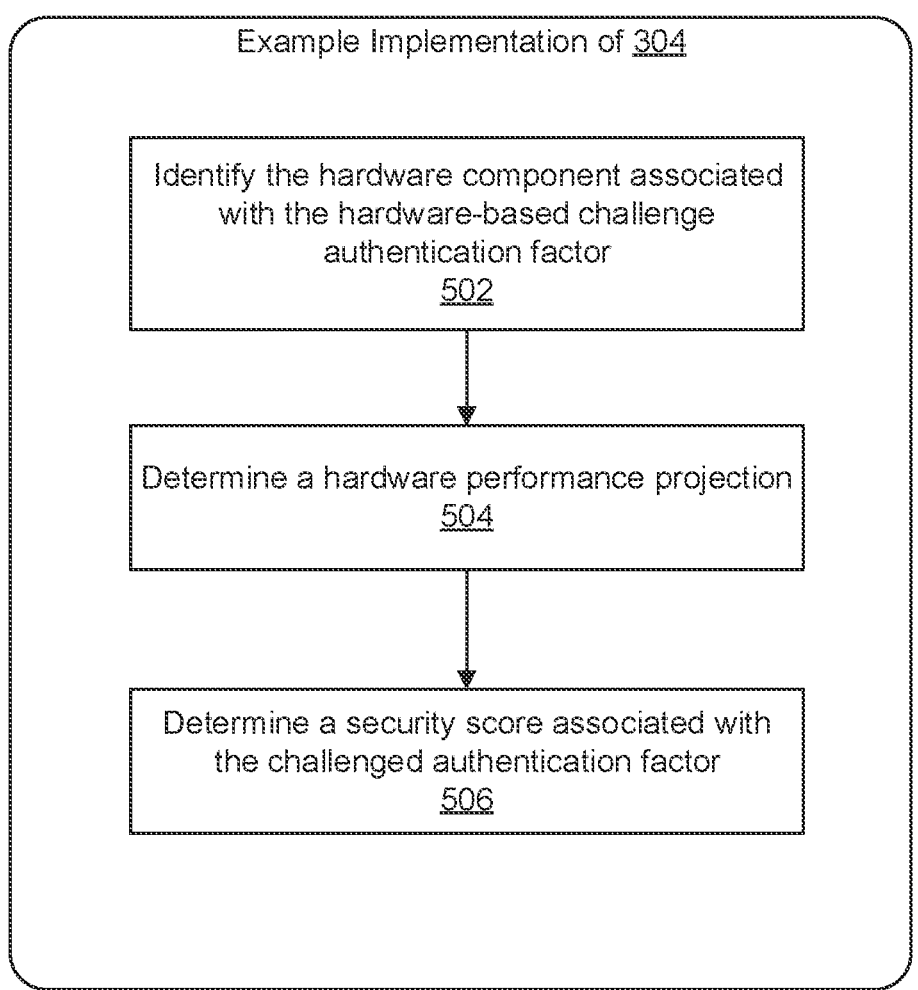
FIG. 5 illustrates an example flowchart for determining a security score for a hardware-based challenge authentication factor, in accordance with some example embodiments described herein.

Turning to FIGS. 3-5, example flowcharts are illustrated that contain example operations implemented by example embodiments described herein. The operations illustrated in FIGS. 3-5 may, for example, be performed by the machine authentication manager 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, authentication engine 208, challenge circuitry 210, and/or any combination thereof. It will be understood that user (e.g., an autonomous machine, or the like) interaction with the machine authentication manager 102 may occur directly via communications hardware 206, or may instead be facilitated by a separate machine 106A, as shown in FIG. 1, and which may have similar or equivalent physical componentry facilitating such user interaction.

Turning first to FIG. 3, example operations are shown for simultaneous machine multifactor authentication. In some embodiments, simultaneous multifactor authentication may be performed in accordance with the operations described in U.S. patent application Ser. No. 18/311,149, the entirety of which is incorporated by reference herein.

As shown by operation 302, the apparatus 200 includes means, such as memory 204, communications hardware 206, or the like, for simultaneously receiving a plurality of authentication factors for a machine via a plurality of channels. The plurality of authentication factors for a machine may be security credentials used to verify the authenticity of a machine and later used to authenticate the machine. In some embodiments, the plurality of authentication factors for the machine may be of any machine authentication factor category, such as possession factors, inherence factors, location factors, hardware-based challenge factors, and/or behavior factors. To increase security, the plurality of authentication factors may comprise at least one hardware-based challenge authentication factor (e.g., a received signature associated with the response of a particular hardware component (or multiple hardware components) to a challenge, such as a voltage reading). As one example, the plurality of authentication factors for a machine which are simultaneously received may include at least one hardware-based challenge authentication factor, a possession factor (e.g., a serial number), a location factor (e.g., location data indicating a current physical location of the machine), and/or the like.

In some embodiments, the plurality of authentication factors may be transmitted from one or more machines (e.g., machine 106A through machine 106N, or the like) via a plurality of channels of a cellular network (e.g., a 6G cellular network, such as communications network 104, shown in FIG. 1) simultaneously to the apparatus 200. In some embodiments, the 6G cellular network may utilize higher frequencies (e.g., millimeter waves of 30 to 300 GHz and terahertz waves ranging from 300 to 3000 GHz) than its predecessor, 5G cellular networks which leverage 2 to 30 GHz waves. The higher frequencies leveraged by a 6G cellular network may enable a higher capacity and reduced latency. In some embodiments, the reduced latencies offered by such cellular networks may permit the transmission of data via a larger number of channels (e.g., leveraging intermediary nodes that historically may not have been able to facilitate distribution of data), and in doing so may permit enhanced parallelism via the simultaneous reception of data via a plurality of channels.

In some embodiments, the authentication factors included in the plurality of authentication factors for a machine may be simultaneously transmitted via separate channels included in the plurality of channels. For example, possession factors may be transmitted via channel A, inherence factors via channel B, location factors via channel C, behavior factors via channel D, and hardware-based challenge factors via channel E. In some embodiments, the authentication factor type (e.g., serial number, hardware-based challenge authentication factor, battery degradation data, or the like) may determine the channel to transmit the authentication factor. In some embodiments, the same authentication factor may be transmitted from multiple machines (e.g., machine 106A through machine 106N, or the like). For example, authentication factor A may be transmitted to the apparatus 200 via channel A of a 6G cellular network (e.g., communications network 104, FIG. 1) from machine 106A, 106B, and 106C. Machine 106A, machine 106B, and machine 106C may use the same communication channel included in the plurality of communication channels because the computing devices are simultaneously transmitting the same authentication factor and hence the same authentication factor category. Alternatively, a separate communication channel may be used for each computing device transmitting the authentication factor to the apparatus 200.

In some embodiments, the plurality of authentication factors for a machine may be received in response to a machine authentication request. The machine authentication request may be an electronic request to authenticate a session with a machine. The machine authentication request may indicate one or more actions (e.g., tasks) requested to be completed by the machine that require multifactor machine authentication. In some embodiments, a set of machine multifactor authentication rules may be stored in a storage device accessible to the components of the apparatus 200 (e.g., storage device 108, memory 204, or the like) that indicates a machine authentication procedure to authorize one or more actions (e.g., the set of machine multifactor authentication rules may indicate a security score threshold that must be satisfied to authorize one or more actions, which is described further below in connection with operations 304 and 306). The one or more actions may be a real-world step or operation. In some embodiments, one or more actions may be any requested operation that requires machine multifactor authentication. Some example one or more actions may include updating software and/or firmware, data transmission (e.g., a machine that collects data may require authentication to transmit the collected data), task assignment (e.g., a task assigned by the apparatus 200 to the machine), data collection (e.g., authentication may be required for a machine to collect particular data), and/or the like.

In some embodiments, the machine authentication request may be received from a computing device (e.g., machine 106A, or the like) via a channel of a network (e.g., a 6G cellular network such as communications network 104). In some embodiments, the machine authentication request may be received simultaneously with the reception of the plurality of authentication factors for a machine. For example, a plurality of channels of a 6G cellular network may simultaneously receive the machine authentication request and the plurality of authentication factors for the machine. Alternatively, the machine authentication request may be received prior to the simultaneous reception of the plurality of authentication factors for a machine. For example, the machine authentication request may be received by communications hardware 206 and trigger an instruction to be transmitted to the computing device that transmitted the machine authentication request that instructs the computing device to simultaneously transmit a plurality of authentication factors for the machine from one or more computing devices (e.g., machine 106A through machine 106N, or the like).

In some embodiments, an automatic trigger event may cause the transmission of a machine authentication request from a computing device (e.g., machine 106A, or the like). An automatic trigger event may include a temporal trigger event, a circumstantial trigger event, and/or the like. A temporal trigger event may take place based on rules and/or configurations that require a machine authentication request to be generated within a particular time period or at a particular point in time. For example, a temporal trigger may be configured to periodically (e.g., monthly) transmit a machine authentication request from a particular machine (e.g., machine 106A) to the apparatus 200 (e.g., communications hardware 206) and simultaneously provide a plurality of authentication factors in order to verify the particular machine, such that the apparatus 200 may authorize a monthly software update to the machine.

A circumstantial trigger event may take place based on rules and/or configurations that require that a machine authentication request be generated in response to a set of conditions and/or criteria being met. For example, a circumstantial trigger may be configured to generate a machine authentication request if a software update for a particular machine was recently released.

In some embodiments, the one or more actions in the machine authentication request may require the performance of one or more hardware-based challenges and thus one or more hardware-based challenge authentication factors associated with a machine. Causing performance of hardware-based challenges to obtain hardware-based challenge authentication factors for a machine are described in further detail below in relation to FIG. 4.

Turning now to FIG. 4, example operations are shown for causing performance of hardware-based challenge requests associated with a machine.

As shown by operation 402, the apparatus 200 includes means, such as memory 204, communications hardware 206, or the like, for transmitting a challenge instruction to the machine. In some embodiments the challenge instruction may be included in an electronic request (e.g., a challenge request) that is transmitted from the apparatus 200 to a machine. In some embodiments, the challenge instruction may include a particular type of hardware-based challenge. For example, the challenge instruction may instruct a particular machine to generate an impedance measurement. In this regard, the machine may apply an alternating current (AC) voltage to the designated hardware component (e.g., a hardware component, such as a battery, indicated in the challenge instruction). Subsequently, the machine may measure the impedance of the particular hardware component in response to the AC voltage.

An impedance measurement increases security for authentication due to its complexity (e.g., an impedance measurement may be influenced by various factors, such as the physical properties of a hardware component, the frequency of the applied AC, etc.) making it difficult for bad actors to precisely know and replicate the impedance measurement for a particular hardware component. In some embodiments, to further increase complexity and thereby increase security, the challenge instruction may describe challenging a randomly chosen hardware component from a plurality of hardware components included in the machine. In addition, a frequency for the applied AC may be randomly chosen further increasing the complexity of the impedance measurement for a particular hardware component. Additionally or alternatively, the challenge instruction may instruct a particular machine (e.g., machine 106A, or the like) to perform a different measurement (e.g., any measurement that is not impedance) in order to challenge a hardware component. For example, the challenge instruction may instruct the machine to generate measurements, such as a capacitance measurement by challenging a capacitor of the machine, an inductance measurement by challenging an inductor of the machine, and/or the like.

In some embodiments, the challenge instruction may be transmitted from the apparatus 200 (e.g., communications hardware 206) to one or more machines (e.g., machine 106A through machine 106N, or the like). For example, communications hardware 206 may transmit the challenge instruction to machine 106A via a network (e.g., a 5G advanced or 6G cellular network, such as communications network 104 shown in FIG. 1) that causes the machine to perform a particular hardware-based challenge and measurement. In some embodiments, the particular channel through which the challenge instruction is transmitted may be based on the challenge instruction. For example, a challenge instruction associated with challenging hardware component A may be transmitted via channel A, a challenge instruction associated with challenging hardware component B may be transmitted via channel B, and/or the like. Additionally or alternatively, the challenge instruction may be routed to a particular communication channel based on the machine associated with the challenge instruction. For example, a location of a particular machine may dictate the routing of the challenge instruction. In some embodiments, all challenge instructions, since they are associated with a hardware-based challenge authentication factor, may be routed to the same channel (e.g., channel A may be specifically designated for communication regarding hardware-based challenge authentication factors).

As shown by operation 404, the apparatus 200 includes means, such as memory 204, communications hardware 206, or the like, for receiving the at least one hardware-based challenge authentication factor. In some embodiments, the apparatus 200 may receive measurement (e.g., at least one hardware-based challenge authentication factor) caused by the challenge instruction that indicates a response of a hardware component included in a particular machine as a result of a particular challenge. For example, the at least one hardware-based challenge authentication factor may be transmitted from a machine (e.g., machine 106A) to the apparatus 200 (e.g., communications hardware 206) via a network (e.g., communications network 104, shown in FIG. 1). The apparatus 200 may subsequently store the hardware-based authentication factor in association with the particular machine that performed the hardware-based challenge.

In some embodiments, the at least one hardware-based challenge authentication factor may be received via a particular communication channel. For example, a machine may use a particular communication channel to transmit hardware-based challenge authentication factors and thus the communications hardware 206 may receive the at least one hardware-based challenge authentication factor via that communication channel. In some embodiments, the reception of at least one hardware-based challenge authentication factor may occur in parallel with the reception of a variety of other authentication factors regarding a machine via a plurality of channels of a communications network (e.g., communications network 104, shown in FIG. 1). The reception and verification of the plurality of authentication factors is described further below in connection with FIG. 3 and FIG. 5.

Returning to FIG. 3, as shown by operation 304, the apparatus 200 includes means, such as memory 204, communications hardware 206, authentication engine 208, or the like, for verifying the plurality of authentication factors in parallel. In some embodiments, parallelism may be accomplished by the authentication engine 208 by simultaneously comparing each of the plurality of authentication factors for a machine to a corresponding plurality of signature authentication factors associated with the machine. The plurality of signature authentication factors associated with the machine may be previously collected and stored in a local storage device (e.g., memory 204, storage device 108, or the like) and may comprise at least one hardware-based signature authentication factor and additional authentication factors of various authentication categories associated with the machine. For example, a machine may register with the apparatus 200 to become a machine that may use simultaneous machine multifactor authentication in connection with the apparatus 200 (i.e., the machine authentication manager 102). As a part of the registration process, the machine may transmit a plurality of signature authentication factors that may be used for later authentication procedures. For example, the apparatus 200 (e.g., communications hardware 206) may transmit an instruction the newly registered machine to transmit a plurality of signature authentication factors. In some embodiments, communications hardware 206 may transmit a challenge instruction to the newly registered device which instructs the machine to provide a plurality of signature hardware-based challenge authentication factors for a plurality of components of the machine, such that the apparatus 200 may reference one or more of the signature hardware-based challenge authentication factors when verifying future hardware-based challenge authentication factors received in response to a challenge instruction.

In some embodiments, the signature authentication factors associated with the machine may be associated with a time stamp indicating the length of time since the signature authentication factors were acquired by the apparatus 200. In some embodiments, after a predetermined set amount of time (e.g., predetermined by an entity that adjudicates the simultaneous machine multifactor authentication), communications hardware 206 may prompt the machine (e.g., machine 106A, or the like) via an electronic request that may comprise instructions for the machine to transmit one or more updated signature authentication factors.

In some embodiments, the predetermined set amount of time that indicates when to update a signature authentication factor for a machine included in the plurality of signature authentication factors for a machine may vary depending on the particular authentication factor. For example, a signature authentication factor associated with battery health may need to be routinely updated since battery health degrades at a significant rate over time. Alternatively, if the type of battery is known to the apparatus 200 (e.g., a signature authentication factor associated with the battery for a particular machine may include data that describes the type of battery included in the particular machine) the authentication engine 208 may be able to calculate or use a reference table stored in a storage device (e.g., memory 204, storage device 108, or the like) to estimate battery health (e.g., capacity and/or performance) and how the battery's health may degrade over time based on the age of the battery and the battery type without requiring an updated signature authentication factor related to the battery.

In some embodiments, the machine may be a part of a fleet of machines that are associated with a blockchain network. For example, machine 106A through machine 106N may be computing devices (e.g., nodes) included in a blockchain network. In some embodiments, the computing devices in the blockchain network may identify whether a modification to the hardware or software of a machine (e.g., machine 106A, or the like) included in the blockchain network has occurred. In some embodiments, the computing devices included in the blockchain network (e.g., machine 106A, or the like) may undergo a device registration process associated with the blockchain network such that the blockchain network is updated with information concerning the hardware and software associated with the newly registered computing device. In some embodiments, any time a computing device that is included in the blockchain network undergoes a software or hardware modification, the software or hardware modification may trigger an event that indicates the occurrence of a software or hardware modification. In this regard, each computing device included in the blockchain network may be associated with a smart contract that governs how modifications to both the hardware and the software for a particular machine are monitored. For example, a smart contract for a device that is high security may describe rules and logic for monitoring any modification to the devices hardware and/or software. Additionally or alternatively, a smart contract for a device that is low security may describe rules and logic for monitoring only select modifications to the devices hardware and/or software.

In some embodiments, the apparatus 200 (e.g., communications hardware 204) may receive a modification notification from the blockchain network. The modification notification may describe the nature of the modification (e.g., a particular hardware component that was updated, a time stamp associated with the modification, or the like), a unique identifier associated with the modified computing device (e.g., machine 106A, or the like), and/or the like. In some embodiments, authentication engine 208 may one or more techniques to identify the modification to the computing devices hardware or software, such as optical character recognition (OCR), natural language processing (NLP), searching algorithms, machine learning models, and/or the like. For example, authentication engine 208 may OCR any data in the modification notification, if needed, and then search for an indicator of the particular modification to the hardware or software associated with a machine.

In some embodiments, communications hardware 206 may receive an update notification (e.g., a modification notification) about a particular machine (e.g., machine 106A) from a different machine (e.g., machine 106N). Authentication engine 208 may then retrieve the plurality of signature authentication factors associated with the particular machine from a local storage device, such as memory 204, storage device 108, or the like. Authentication engine 208 may use any suitable technique, such as optical character recognition (OCR), natural language processing (NLP), searching algorithms, machine learning models, and/or the like to identify one or more of the plurality of signature authentication factors associated with the particular machine that require an update in response the update notification. For example, assume the received update notification describes a replacement to the battery associated with the particular machine 106A. In addition, the update notification may include security credentials (e.g., authentication factors for the particular machine with the updated hardware and the machine that transmitted the update notification). In this regard, authentication engine 208 may verify the authentication factors as described below and identify any signature authentication factors included in the plurality of signature authentication factors associated with the machine that is associated with the battery, such as a previous hardware-based challenge authentication factor associated with the batter, information about the particular battery, and/or the like.

In some embodiments, the modification notification about a particular machine (e.g., machine 106A) from a different machine (e.g., machine 106N) included in the blockchain network may include a machine authentication profile about the particular machine. A machine authentication profile may comprise of a plurality of different authentication factors about a particular machine (e.g., machine 106A) from one or more different machines in the fleet of machines (e.g., machine 106B, machine 106C, machine 106N, or the like). In some embodiments, the apparatus 200 (e.g., communications hardware 206) may receive the machine authentication profile about the particular machine to (i) verify that a modification to the hardware or software associated with a particular machine has occurred and (ii) to verify the integrity and security of the particular machine in light of the verified modification to the hardware or software associated with the particular machine.

In some embodiments, communications hardware 206 may receive a plurality of authentication factors about a particular machine in parallel with the reception of the modification notification. In some embodiments, the authentication factors about the particular machine may be simultaneously received from the fleet of machines included in the blockchain network via a plurality of channels (e.g., a plurality of channels of a 5G advanced or 6G cellular network, such as communications network 104 in FIG. 1). For example, communications hardware 206 may receive a first authentication factor about a particular machine via channel A, a second authentication factor about the particular machine via channel B, a third authentication factor about the particular machine via channel C, and the modification notification about the particular machine via channel D. Authentication engine 208 may then generate a machine authentication profile that includes the authentication factors received via the plurality of channels from the fleet of machines. In some embodiments, authentication engine 208 may search a reference table in a storage device (e.g., memory 204, storage device 108, or the like) that describes the quantity or quality of the received authentication factors that are required to ensure the security and integrity of a modified machine.

In some embodiments, authentication engine 208 may evaluate the plurality of authentication factors for a machine (e.g., received in operation 302) by determining a security score. A security score may be a computed score describing the authenticity of data based on the similarity between two or more pieces of data (e.g., (i) a plurality of signature authentication factors associated with a machine and (ii) at least a subset of the plurality of authentication factors). In some embodiments, the determined security score is a numerical score (e.g., a score between 0 and 1), which in other embodiments the determined security score may be converted into a categorical result (e.g., tier 1/tier 2/tier 3, green/yellow/red, or some other categorical classification). For example, a comparison of a plurality of signature authentication factors associated with a machine to a plurality of authentication factors for a machine may yield a high security score indicating similarity and thus authenticity between the plurality of signature authentication factors associated with a machine and the plurality of authentication factors for a machine.

In some embodiments where the determined security score is a numerical score, the security score may be computed by calculating a Hamming distance between two arrays describing the plurality of signature authentication factors associated with a machine and plurality of authentication factors for a machine. The Hamming distance may be normalized to produce the security score. In some embodiments, to enable parallelism (which may enhance computational speed), a per-authentication factor security score may be computed describing the security of a particular (e.g., a singular) authentication factor for a machine based on the similarity between the particular authentication factor for a machine and a corresponding particular signature authentication factor of the plurality of signature authentication factors associated with a machine. Further, each per-authentication factor's security score may be weighted based on the authentication factor category. For example, a possession factor may be weighted differently than a location factor based on a predetermined security level for each authentication factor category.

In some embodiments, authentication engine 208 may leverage a security scoring model to determine per-authentication factor security scores that enable performing verification operations that evaluate the plurality of authentication factors for a machine in parallel. The security scoring model may be a computational model that is configured to process a plurality of signature authentication factors associated with a machine and/or a plurality of authentication factors for a machine to generate a security score that is indicative of the authenticity of the plurality of authentication factors for a machine. In some embodiments, the security scoring model may utilize a hash function to map data (e.g., plurality of signature authentication factors associated with a machine, plurality of authentication factors for a machine, or the like) of an arbitrary size to fix-size values. The security scoring model may further use a locally sensitive hash function that allows for the comparison of authentication factors for a machine using its computed hash value. For example, authentication engine 208 may leverage the security scoring model to compute a hash value for an IP address received from a machine in operation 302. Subsequently, authentication engine 208 may retrieve from a local storage device (e.g., memory 204, storage device 108, or the like) a hash value of the signature authentication factor associated with the IP address for a machine or retrieve the signature authentication factor associated with the IP address and compute a hash value for the signature authentication factor. The verification of hardware-based challenge authentication factors is described further below in relation to FIG. 5. As a result, authentication engine 208 may compare the two computed hash values (e.g., (i) a computed hash value for the received IP address and (ii) the computed hash value for the signature authentication factor associated with a machine's IP address) and based on the comparison, determine a security score associated with the particular authentication factor (e.g., an IP address) for a machine.

In some embodiments, the calculation of a security score for a particular authentication factor for a machine may be repeated until each authentication factor included in the plurality of authentication factors for a machine has a calculated per-authentication factor security score. Additionally or alternatively, authentication engine 208 may leverage a plurality of security scoring models or a singular security scoring model that is/are capable of computing security scores for the plurality of authentication factors for a machine to enable the authentication engine 208 to verify the plurality of authentication factors for a machine based on each authentication factor for a machine's respective security score in parallel. The per-authentication factor security scores may be weighted and summed to produce a security score. It will be appreciated that other methods for calculating similarity and security scores may be used in various embodiments.

In some embodiments, determining a security score and/or verifying hardware-based challenge authentication factors may include determining and using a hardware performance projection associated with a particular hardware component that is associated with the machine. In some embodiments, verifying a hardware-based authentication factor may be performed in accordance with the operations described by FIG. 5. Turning now to FIG. 5, example operations are shown for determining a security score for a hardware-based authentication factor.

As shown by operation 502, the apparatus 200 includes means, such as memory 204, challenge circuitry 210, or the like, for identifying the hardware component associated with a hardware based challenge authentication factor. In some embodiments, a challenge based authentication factor that is an authentication factor for a machine included in the plurality of authentication factors for a machine received in operation 302 and may be associated with any challengeable hardware component included in the machine, such as various sensors, transistors, batteries, and/or the like.

In some embodiments, challenge circuitry 210 may retrieve the plurality authentication factors for a machine from a local storage device (e.g., memory 204, storage device 108, or the like). Subsequently, challenge circuitry 210 may use various techniques to identify a hardware-based challenge authentication factor, such as optical character recognition (OCR), natural language processing (NLP), searching algorithms, machine learning models, and/or the like. For example, challenge circuitry 210 may OCR any data in the retrieved plurality of authentication factors for a machine, if needed, and then search for an indicator of a hardware-based challenge authentication factor. For example, challenge circuitry 210 may search for particular hardware components (e.g., microphone, speaker, battery, or the like), which may act as an identifier to identify a hardware-based challenge authentication factor.

In some embodiments, challenge circuitry 210 may similarly identify the particular hardware component associated with the identified hardware-based challenge authentication factor. For example, challenge circuitry 210 may use any suitable technique, such as optical character recognition (OCR), natural language processing (NLP), searching algorithms, machine learning models, and/or the like to identify the hardware component associated with the hardware-based challenge authentication factor.

As shown by operation 504, the apparatus 200 includes means, such as memory 204, challenge circuitry 210, or the like, for determining a hardware performance projection. In some embodiments, a hardware performance projection may be data that describes a prediction of a hardware-based challenge authentication factor. For example, in the context of a battery, hardware performance projection may indicate the degradation of the battery and how the battery's performance and response to hardware-based challenges may change over time (e.g., how the degradation of the battery may affect the received challenge based authentication factor).

In some embodiments, a reference table may be stored in a local storage device, such as memory 204, storage device 108, or the like, for a particular hardware component. In some embodiments, the reference table may indicate a predicted response that a particular hardware component may exhibit to a particular challenge (e.g., a voltage) and how the response may change as the particular hardware component ages. In such an embodiments, challenge circuitry 210 may search the reference table for the hardware performance projection associated with the particular hardware and age of the particular hardware challenged in the hardware-based challenge authentication factor.

In some embodiments, challenge circuitry 210 may leverage a hardware performance model (e.g., a machine learning model) to determine the hardware performance projection. In some embodiments the hardware performance model may be trained (e.g., in a supervised manner) on a dataset containing voltage values and ages of a particular hardware component and corresponding result measurements (e.g., impedance measurements, capacitance measurements, or the like). In some embodiments, challenge circuitry 210 may retrieve, from a local storage device (e.g., memory 204, storage device 108, or the like), an input such as a voltage, particular hardware component, and/or the age of the hardware component associated with a particular challenge based authentication factor. Subsequently, the hardware performance model may process the input to determine an output in the form of a hardware performance projection.

As shown by operation 506, the apparatus 200 includes means, such as memory 204, authentication engine 208, or the like, for determining a security score associated with the hardware-based challenge authentication factor. In some embodiments, authentication engine 208 may use a similar or the same security scoring model that is described in operation 304 to determine a security score associated with the hardware-based challenge authentication factor. The security scoring model may determine a per-authentication factor security score associated with the hardware-based challenge authentication factor in parallel with determining per-authentication factor security scores associated with the other plurality of signature authentication factors associated with the machine.

In some embodiments, to determine a per-authentication factor security score for the hardware-based challenged authentication factor, the security scoring model may be input the hardware performance projection and the hardware-based challenge authentication factor. In some embodiments, the security scoring model may assign a security score based on the error between the hardware performance projection and the hardware-based challenge authentication factor. For example, the security scoring model may be further input data from a reference table that describes a per-authentication factor security score that is associated with a similarity between the hardware performance projection and the hardware-based challenge authentication factor.

In some embodiments, the security scoring model may use a hash function to map data (e.g., a hardware performance projection, a hardware-based challenge authentication factor, or the like) of an arbitrary size to fix-size values. The security scoring model may further use a locally sensitive hash function that allows for the comparison of the hardware performance projection and the hardware-based challenge authentication factor for a machine using its computed hash value. For example, authentication engine 208 may leverage the security scoring model to compute a hash value of an impedance measurement and the hardware performance projection of the same impedance measurement. The security scoring model may subsequently determine a per-authentication factor security score based on the hash value comparison.

Returning to FIG. 3, as shown by operation 306, the apparatus 200 includes means, such as memory 204, communications hardware 206, authentication engine 208, or the like, for authorizing one or more actions based on a successful verification of the plurality of authentication factors. In some embodiments, a successful verification operation may describe that the calculated security score (operation 304) satisfies a security score threshold associated with the requested one or more actions. For example, one or more actions associated with a security score threshold of 90 may require that the calculated security score based off of the plurality of received authentication factors for a machine satisfy a security score threshold of 90.

In some embodiments, authorization of the one or more actions based on the successful verification operation may be passive (e.g., with no notification provided to the machine), and the authentication engine 208 may execute the one or more actions. Alternatively, the apparatus 200 (e.g., communications hardware 206) may cause transmission of a message or notification that comprises the message to a computing device (e.g., machine 106A through machine 106N) that indicates a successful authorization of one or more actions. In addition, a visual indicator may remain present on a computing device (e.g., machine 106A, or the like) associated with the authorized one or more actions as long as the authenticated session is currently active.

In some embodiments, the security score threshold associated with a particular one or more actions may be modified if authentication engine 208 identifies an exogenous context. The modification of the required security score may include lowering the security score threshold associated with one or more actions. Additionally or alternatively, the modification of the required security score may include modifying the weights associated with the per-authentication factor security scores. In some embodiments an exogenous context may be an external condition that impacts the reception of the plurality of authentication factors associated with a machine. For example, an exogenous context may be any event that imposes a disability to receive authentication factors about a machine, such as a natural disaster, power outage, or the like.

In some embodiments, authentication engine 208 may reference a set of exogenous context rules located in a storage device (e.g., storage device 108, memory 204, or the like) to identify occurrence of an exogenous context. For example, the set of exogenous context rules may describe if a certain percentage of incoming machine authentication requests include only a subset of the plurality of authentication factors, authentication engine 208 may then determine an occurrence of an exogenous context. In some embodiments, a machine (e.g., machine 106A, or the like) may transmit a message via a network (e.g., a 5G advanced or 6G cellular network, such as communications network 104 shown in FIG. 1) to the apparatus 200 (e.g., communications hardware 206) describing an exogenous context. For example, a machine may transmit in parallel with the plurality of authentication factors for the machine via a plurality of channels an exogenous context message describing a recent power outage, such as "power outage due to weather conditions", or the like.

The authentication engine 208 may use any suitable techniques to identify the exogenous context in the exogenous context message, such as optical character recognition (OCR), natural language processing (NLP), searching algorithms, machine learning models, and/or the like. For example, authentication engine 208 may OCR any data in the exogenous context message, if needed, and then search for an indicator of exogenous context. For example, the authentication engine 208 may search for weather emergencies (e.g., blizzard, earthquake, flooding, or the like), which may act as an identifier to identify occurrence of an exogenous context. In some embodiments, the authentication engine may store the identified exogenous context message in a storage device (e.g., memory 204, storage device 108) and metadata about the exogenous context message to aid the authentication engine 208 in deducing an exogenous context for other machines transmitting a plurality of authentication factors for a machine. For example, a first machine may transmit a plurality of authentication factors for a machine and an exogenous context message. The apparatus 200 (e.g., communications hardware 206) may also receive a plurality of authentications factors for a second machine, which may not include an exogenous context message. Authentication engine 208 may then determine if the second machine is within a predefined proximity to the first machine by searching for location data associated with the plurality of authentication factors for the second machine, metadata about the exogenous context message, or the like. If the second machine is located within a predefined proximity to the first machine experiencing an exogenous context, the authentication engine 208 may also identify an exogenous context for the second machine.

In some embodiments, after one or more actions are authorized and executed, a machine may again request to execute the same one or more actions or a different one or more actions. In some embodiments, the one or more actions may be automatically authorized if the security score threshold of the requested one or more actions is below the security score for the current authenticated session. However, in some embodiments the different one or more actions may require a security score that satisfies the security score threshold associated with the authenticated session that is associated with the plurality of authentication factors about a machine received in operation 302.

FIGS. 3, 4, and 5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved ability to use multifactor authentication to authenticate machines by leveraging capabilities of a 5G advanced or 6G cellular network to simultaneously receive and authentication multiple authentication factors. Example embodiments thus provide tools that overcome the problems faced by conventional implementations of multifactor authentication that involve sequentially verifying each authentication factor about a machine. By avoiding the need to sequentially verify each authentication factor, example embodiments thus save time and reduce the risk of bad actors accessing the authentication factors associated with a machine. Moreover, embodiments described herein avoid the problems faced by traditional single factor authentication techniques, such as IP addresses, serial numbers, location data, and/or the like. Finally, by using hardware-based challenge authentication factors and receiving one or more authentication factors from other computing devices in parallel via a plurality of channels, example embodiments unlock many potential new functions that have historically not been available, such as the ability to conduct near real time authentication of a machine using a plurality of authentication factors for a machine, thereby greatly enhancing the efficiency, accuracy, and security of the authentication process as a whole.

As these examples all illustrate, example embodiments contemplated herein provide technical solutions that solve real-world problems faced during example implementations of multifactor authentication for a machine. And while malicious interception of authentication factors has been an issue for decades, the recently exploding amount of malware available today has made this problem significantly more acute, as more entities transition to using multifactor authentication for machines even while the complexity for verifying multiple authentication factors has itself increased. At the same time, the recently arising ubiquity and capabilities of cellular networks (e.g., 5G advanced and 6G cellular networks) has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for simultaneous machine multifactor authentication, the method comprising:

receiving, by communications hardware, a plurality of signature authentication factors associated with a machine, wherein the plurality of signature authentication factors includes a hardware-based signature authentication factor;

storing, by the communications hardware, the plurality of signature authentication factors in association with the machine;

transmitting, by the communications hardware, a machine authentication request to the machine, the machine authentication request comprising a challenge instruction that instructs the machine to generate a measurement of an electrical characteristic of a hardware component of the machine;

receiving, by the communications hardware and in response to the machine authentication request, a plurality of authentication factors for the machine, wherein the plurality of authentication factors comprises a hardware-based challenge authentication factor indicating the measurement of the electrical characteristic of the hardware component generated by the machine in response to the challenge instruction;

identifying, by challenge circuitry, the hardware component associated with the hardware-based challenge authentication factor, determining, by the challenge circuitry and based on the plurality of signature authentication factors, a hardware performance projection associated with the hardware component;

verifying, by an authentication engine and based at least on a subset of the plurality of signature authentication factors, the plurality of authentication factors for the machine by:

determining, by the authentication engine, a security score associated with the hardware-based challenge authentication factor based on a comparison of the hardware-based challenge authentication factor and the hardware performance projection; and authorizing, by the authentication engine, one or more actions to be performed by the machine based on a successful verification of the plurality of authentication factors.

2. The method of claim 1, further comprising:

in an instance in which the machine is modified:

receiving, by the communications hardware, a modification notification;

identifying, by the authentication engine and based on the modification notification, a modification to hardware or software associated with the machine; and updating, by the authentication engine, the plurality of signature authentication factors.

3. The method of claim 2, wherein the machine is a part of a fleet of machines associated with a blockchain network.

4. The method of claim 3, wherein identifying the modification to the hardware or the software comprises:

receiving, by the communications hardware and from the blockchain network, a machine authentication profile for the machine, wherein the machine authentication profile is verified by one or more other machines of the fleet of machines; and verifying, by the authentication engine, the modification to the machine based on the machine authentication profile.

5. The method of claim 4, wherein the machine authentication profile includes authentication factors received via the fleet of machines.

6. The method of claim 1, wherein the plurality of authentication factors are received via a 5G advanced cellular network or a 6G cellular network.

7. The method of claim 1, wherein the measurement of the electrical characteristic comprises at least one of an impedance measurement of the hardware component, a capacitance measurement of the hardware component, or an inductance measurement of the hardware component.

8. The method of claim 1, wherein the plurality of authentication factors for the machine are received simultaneously via a plurality of channels, and wherein the plurality of authentication factors for the machine are verified in parallel.

9. An apparatus for simultaneous machine multifactor authentication, the apparatus comprising:

communications hardware configured to:

receive a plurality of signature authentication factors associated with a machine, wherein the plurality of signature authentication factors includes a hardware-based signature authentication factor;

store the plurality of signature authentication factors in association with the machine;

transmit a machine authentication request to the machine, the machine authentication request comprising a challenge instruction that instructs the machine to generate a measurement of an electrical characteristic of a hardware component of the machine, and receive, in response to the machine authentication request, a plurality of authentication factors for the machine, wherein the plurality of authentication factors comprises a hardware-based challenge authentication factor indicating the measurement of the electrical characteristic of the hardware component generated by the machine in response to the challenge instruction;

challenge circuitry configured to:

identify the hardware component associated with the hardware-based challenge authentication factor, and determine, based on the plurality of signature authentication factors, a hardware performance projection associated with the hardware component; and an authentication engine configured to:

verify, based at least on a subset of the plurality of signature authentication factors, the plurality of authentication factors for the machine by:

determining a security score associated with the hardware-based challenge authentication factor based on a comparison of the hardware-based challenge authentication factor and the hardware performance projection; and authorize one or more actions to be performed by the machine based on a successful verification of the plurality of authentication factors.

10. The apparatus of claim 9, wherein in an instance in which the machine is modified:

the communications hardware further configured to receive a modification notification; and the authentication engine further configured to:

identify, based on the modification notification, a modification to hardware or software associated with the machine; and update the plurality of signature authentication factors.

11. The apparatus of claim 10, wherein the machine is a part of a fleet of machines associated with a blockchain network.

12. The apparatus of claim 11, wherein the communications hardware is further configured to receive, from the blockchain network, a machine authentication profile for the machine, wherein the machine authentication profile is verified by one or more other machines of the fleet of machines; and wherein the authentication engine is further configured to:

verify the modification to the machine based on the machine authentication profile.

13. The apparatus of claim 9, wherein the measurement of the electrical characteristic comprises at least one of an impedance measurement of the hardware component, a capacitance measurement of the hardware component, or an inductance measurement of the hardware component.

14. The apparatus of claim 9,
wherein the plurality of authentication factors for the machine are received simultaneously via a plurality of channels, and
wherein the plurality of authentication factors for the machine are verified in parallel.

15. A non-transitory computer-readable storage medium storing instructions that, when executed by an apparatus, cause the apparatus to:
receive a plurality of signature authentication factors associated with a machine, wherein the plurality of signature authentication factors includes a hardware-based signature authentication factor;
store the plurality of signature authentication factors in association with the machine;
transmit a machine authentication request to the machine, the machine authentication request comprising a challenge instruction that instructs the machine to generate a measurement of an electrical characteristic of a hardware component of the machine;
receive, in response to the machine authentication request, a plurality of authentication factors for the machine, wherein the plurality of authentication factors comprises a hardware-based challenge authentication factor indicating the measurement of the electrical characteristic of the hardware component generated by the machine in response to the challenge instruction;
identify the hardware component associated with the hardware-based challenge authentication factor,
determine, based on the plurality of signature authentication factors, a hardware performance projection associated with the hardware component
verify, based at least on a subset of the plurality of signature authentication factors, the plurality of authentication factors for the machine by:
determining a security score associated with the hardware-based challenge authentication factor based on a comparison of the hardware-based challenge authentication factor and the hardware performance projection; and
authorize one or more actions to be performed by the machine based on a successful verification of the plurality of authentication factors.

16. The non-transitory computer-readable storage medium of claim 15, wherein the instructions, when executed by the apparatus, further cause the apparatus to:
in an instance in which the machine is modified:
receiving a modification notification;
identifying, based on the modification notification, a modification to hardware or software associated with the machine; and
updating the plurality of signature authentication factors.

17. The non-transitory computer-readable storage medium of claim 16, wherein the machine is a part of a fleet of machines associated with a blockchain network.

18. The non-transitory computer-readable storage medium of claim 15, wherein the measurement of the electrical characteristic comprises at least one of an impedance measurement of the hardware component, a capacitance measurement of the hardware component, or an inductance measurement of the hardware component.

19. The non-transitory computer-readable storage medium of claim 15,
wherein the plurality of authentication factors for the machine are received simultaneously via a plurality of channels, and
wherein the plurality of authentication factors for the machine are verified in parallel.

20. The non-transitory computer-readable storage medium of claim 15, wherein the plurality of authentication factors are received via a 5G advanced cellular network or a 6G cellular network.

* * * * *